(12) United States Patent
Garapati et al.

(10) Patent No.: US 11,833,852 B2
(45) Date of Patent: Dec. 5, 2023

(54) LOCK FOR WHEEL RIM AND ASSEMBLIES, SYSTEMS, AND METHODS THEREOF

(71) Applicant: Caterpillar Inc., Peoria, IL (US)

(72) Inventors: Prasanth K. Garapati, Bloomington, IL (US); Jacques Elloye, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 556 days.

(21) Appl. No.: 17/000,110

(22) Filed: Aug. 21, 2020

(65) Prior Publication Data
US 2022/0055402 A1    Feb. 24, 2022

(51) Int. Cl.
*B60B 25/14*    (2006.01)
*B60B 25/08*    (2006.01)
*B60B 25/20*    (2006.01)

(52) U.S. Cl.
CPC .............. *B60B 25/14* (2013.01); *B60B 25/08* (2013.01); *B60B 25/20* (2013.01); *B60B 2320/10* (2013.01)

(58) Field of Classification Search
CPC ......... B60B 25/08; B60B 25/10; B60B 25/12; B60B 25/14; B60B 25/18; B60B 25/20
See application file for complete search history.

(56) References Cited

U.S. PATENT DOCUMENTS

| | | |
|---|---|---|
| 1,419,889 A | 6/1922 | Nichols |
| 2,253,320 A | 8/1941 | Berg |
| 3,003,538 A | 10/1961 | Gerbeth |
| 3,599,697 A * | 8/1971 | Gerbeth .................. B60B 25/04 152/410 |
| 4,144,922 A | 3/1979 | Strader |
| 5,107,914 A | 4/1992 | Yamoto et al. |
| 10,226,962 B2 | 3/2019 | Champion et al. |
| 2015/0246578 A1 | 9/2015 | Ofisher et al. |
| 2016/0311254 A1 | 10/2016 | Dahl |
| 2017/0136815 A1 | 5/2017 | Cavanaugh |
| 2018/0147885 A1 | 5/2018 | Delayre |
| 2020/0055332 A1 | 2/2020 | Avalur Nagarajan |

FOREIGN PATENT DOCUMENTS

| | | |
|---|---|---|
| CN | 108407544 A | 8/2018 |
| CN | 208290839 U | 12/2018 |

* cited by examiner

*Primary Examiner* — Jason R Bellinger

(57) ABSTRACT

A wheel rim assembly and components, systems, and methods thereof can have a rim base with at least one slot at an outer end portion thereof, a bead seat band radially outward of the outer end portion of the rim base, and at least one lock provided in the at least one slot. The bead seat band may be in direct contact with the outer end portion of the rim base. The lock can have a first portion that is provided in the slot of the rim base and a second portion that is outside of the slot. The second portion may be adjacent to the bead seat band. The wheel rim assembly may be free of or without a lock ring at the outer end portion of the rim base.

18 Claims, 6 Drawing Sheets

LOCK FOR WHEEL RIM AND ASSEMBLIES, SYSTEMS, AND METHODS THEREOF

TECHNICAL FIELD

The present disclosure relates to a lock for wheel rims and assemblies, systems, and methods thereof.

BACKGROUND

Conventional wheel rim designs may use a compressive-force lock ring to prevent movement of components in a direction along an axis of rotation of the wheel rim. Larger wheel rim designs may also use a driver key to prevent indexing/rotation of the rim components relative to each other, for instance, while under load. Assembly of such wheel rim designs may be relatively complicated, however. Improper assembly may lead to negative performance impacts, such as undesirable relative movement between rim components and corresponding disruption between rim component interfaces and/or the lock ring coming off with significant force.

U.S. Patent Pub. No. 2016/0311254 ("the '254 publication") describes a wheel assembly with a low profile outboard driver locking arrangement. The '254 publication describes that the wheel assembly includes a locking ring radially and axially interposed between the rim and flange member. The '254 publication also describes a locking arrangement mounted between the rim and a flange member slidably received on the rim. According to the '254 publication, the locking ring prevents the flange member from sliding axially off the rim once the elements are assembled with a tire. Also according to the '254 publication, a key is received by the locking arrangement to prevent rotational movement of the rim relative to the flange member and vice versa. As noted above, a lock ring and/or driver key may be undesirable in certain instances.

SUMMARY OF THE DISCLOSURE

In one aspect, the present disclosure describes a wheel rim assembly. The wheel rim assembly can comprise: a rim base having at least one slot at an outer end portion thereof; a bead seat band radially outward of and in direct contact with the outer end portion of the rim base; and at least one lock respectively provided in the at least one slot. Each said at least one lock can have a first portion that is provided in the at least slot of the rim base and a second portion that is outside of the slot and adjacent to the bead seat band. The wheel rim assembly can be free of a lock ring at the outer end portion of the rim base between the rim base and the bead seat band.

In another aspect, the present disclosure describes a method regarding a multi-component wheel rim. The method can comprise: providing a rim base of the multi-component wheel rim, the rim base having an inner end portion, an outer end portion opposite the inner end portion, and a middle portion extending between the inner end portion and the outer end portion, a plurality of slots extending through the outer end portion of the rim base, the slots being spaced apart from each other around a circumference of the rim base; providing a bead seat band of the multi-component wheel rim, the bead seat band being adapted to, when assembled, circumscribe the outer end portion of the rim base such that a portion of the bead seat band is in direct contact with the outer end portion of the rim base; and providing a plurality of locks respectively provided in the plurality of slots of the outer end portion of the rim base, each of the locks having a base and a first projection, the first projection extending from a first side of the base and being adapted to extend into the slot of the rim base when assembled.

In yet another embodiment, a multi-component wheel rim for a tire of a construction or manufacturing vehicle is described. The multi-component wheel rim can comprise: a rim base having an inner end portion, an outer end portion opposite the inner end portion, and a middle portion extending between the inner end portion and the outer end portion in a direction of a central longitudinal axis of the multi-component wheel rim, a plurality of slots extending entirely through the outer end portion of the rim base, the slots being spaced apart from each other around a circumference of the rim base; a pair of side rings, a first side ring of the pair of side rings circumscribing the outer end portion of the rim base and a second side ring of the pair of side rings circumscribing the inner end portion of the rim base; a bead seat band circumscribing the outer end portion of the rim base and being circumscribed by the first side ring such that a portion of the bead seat band is between and in direct contact with the first side ring and the outer end portion of the rim base; and a plurality of locks respectively provided in the plurality of slots of the outer end portion of the rim base, each of the locks being elongate with a base and a first projection, the first projection extending from a first side of the base and into the slot of the rim base, and the base being outside of the slot of the rim base.

Other features and aspects of this disclosure will be apparent from the following description and the accompanying drawings.

DETAILED DESCRIPTION

The present disclosure relates to a lock for wheel rims and assemblies, systems, and methods thereof.

Wheel rims are used to install tires to vehicles, such as manufacturing or construction vehicles (e.g., wheel loaders). Wheel rims used on vehicles with relatively large tires may have structurally reinforced beads that are not sufficiently deformable to slide over side flanges of the rims. As a result, the rims can be formed of multiple pieces, for example, three pieces, four pieces, or five pieces, to facilitate mounting the tires on the rims and removing the tires from the rims. In the case of three- and four-piece wheel rims an outer flange or side ring may also serve as a bead seat band, also known as a taper band or an advance band. Such rims formed of multiple pieces may be referred to as multi-piece wheel rims.

Figure 1:
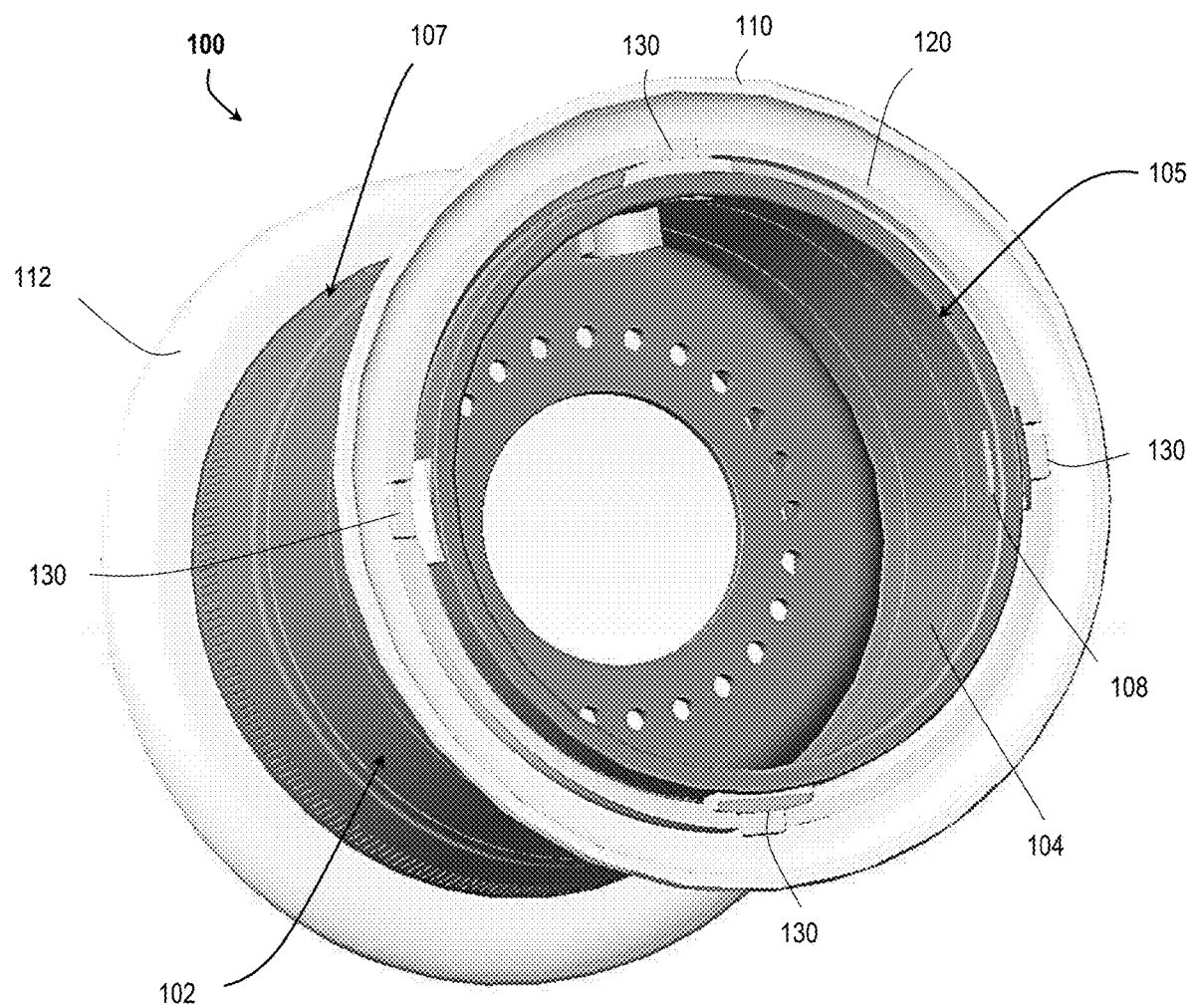
FIG. 1 is an end perspective view of a wheel rim assembly according to one or more embodiments of the disclosed subject matter.
Figure 2:
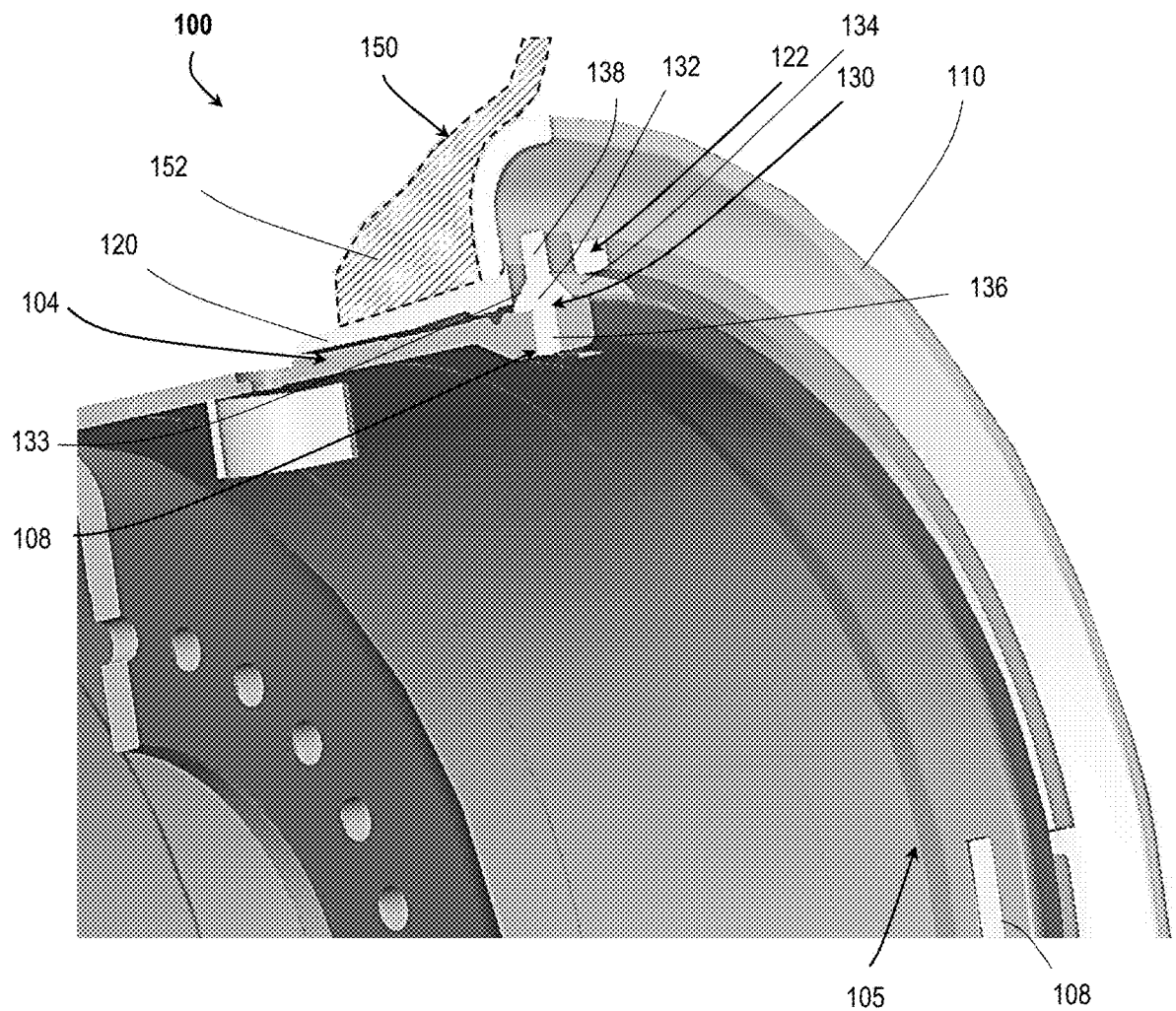
FIG. 2 is an enlarged sectional view of an outer end portion of the wheel rim assembly of FIG. 1.

FIG. 1 is a perspective view of a wheel rim assembly 100 according to one or more embodiments of the disclosed subject matter, and FIG. 2 is an enlarged sectional view of an outer end portion of the wheel rim assembly 100.

The wheel rim assembly 100 can include a wheel rim 102 and a pair of flanges, particularly a first flange 110 and a second flange 112 provided in spaced relation to each other. The first flange 110 and the second flange 112 may be referred to as a first side ring 110 and a second side ring 112, respectively.

The wheel rim 102 can be comprised of a rim base 104 on which a tire 150 (shown, diagrammatically, in FIG. 2) can be mounted, and the first and second side rings 110, 112 can hold the tire 150 on the rim base 104. The first side ring 110 and the second side ring 112 can define bead seats that receive respective tire beads (FIG. 2 shows tire bead 152 associated with the first side ring 110). In this regard, the bead seats can assist with securing the tire 150 on the rim base 104. As shown in FIG. 1, the first side ring 110 can circumscribe the rim base 104, particularly a periphery or outer end portion 105 thereof. Likewise, the second side ring 112 can circumscribe the rim base 104, particularly an inner end portion 107 thereof opposite the outer end portion 105. In the context of the present application inner and outer may refer to the orientation of the wheel rim 102 when provided or as intended to be provided on an axle of a vehicle.

The wheel rim assembly 100 can also include a bead seat band 120. As shown in FIG. 1 and FIG. 2, the bead seat band 120 can be positioned about the periphery or outer end portion 105 of the rim base 104, for instance, circumscribing some or all of the outer end portion 105 of the rim base 104. Also shown in FIG. 1 and FIG. 2, the bead seat band 120 can be provided between the rim base 104 and the first side ring 110, where the first side ring 110 may circumscribe some or all of the bead seat band 120. Discussed in more detail below, the bead seat band 120 can be in direct contact with the outer end portion 105 of the rim base 104 and the first side ring 110, on opposite surfaces of the bead seat band 120.

The wheel rim assembly 100 can also include one or more locks 130. FIG. 1, for instance, shows for locks 130, though embodiments of the disclosed subject matter are not so limited. That is, embodiments of the disclosed subject matter can include one lock 130 or multiple locks, such as two locks 130, three locks 130, or four locks 130, such as shown in FIG. 1. Discussed in more detail below, the one or more locks 130 may be provided in lieu of a lock or locking ring. Hence, wheel rim assemblies, such as wheel rim assembly 100, according to embodiments of the disclosed subject matter, may be free of or without the lock or locking ring between the outer end portion 105 of the rim base 104 and the first side ring 110. Optionally, the one or more locks 130 may be provided in lieu of one or more driver keys. Wheel rim assemblies according to embodiments of the disclosed subject matter, therefore, may also be considered free of or without any driver keys. According to one or more embodiments, the locks 130 may be spaced equally around the circumference of the wheel rim assembly 100 such that the locks 130 are spaced from each other by an equal distance. FIG. 1, for instance, shows the locks 130 spaced from adjacent locks 130 by ninety degrees.

Figure 3A:
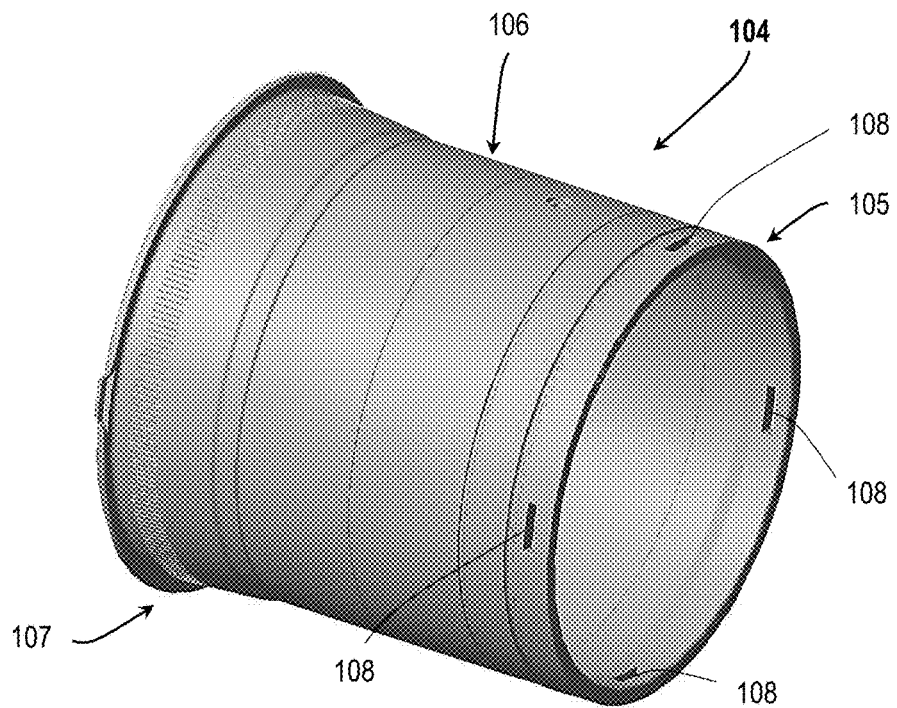
FIG. 3A is a perspective view of a rim base of the wheel rim assembly of FIG. 1.

FIG. 3A is a perspective view of the exemplary rim base 104. The rim base 104 may be defined at opposing ends by the outer end portion 105 and the inner end portion 107. A middle portion 106 may extend between the outer end portion 105 and the inner end portion 107 in a direction of a central longitudinal axis of the rim base 104. Notably, the rim base 104 may have one or more slots 108. FIG. 3A, for instance, shows the rim base 104 having four slots 108. According to one or more embodiments, the slots 108 may be spaced equally around the circumference of the rim base 104 such that the slots 108 are spaced from each other by an equal distance. FIG. 3A, for instance, shows the slots 108 spaced from adjacent slots 108 by ninety degrees.

The slots 108 may have a length greater than a width, where the length of the slots 108 can extend in a circumferential direction of the rim base 104. According to one or more embodiments, the slots 108 may extend entirely through the outer end portion 105 of the rim base 104 in a thickness direction of the rim base 104. Discussed in more detail below, each slot 108 may be sized to receive and retain a portion of a corresponding one of the locks 130.

Figure 3B:
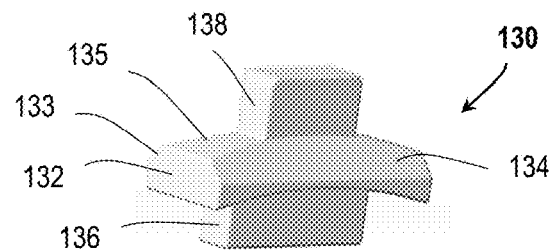
FIG. 3B shows a lock of the wheel rim assembly of FIG. 1.

FIG. 3B shows an exemplary lock 130 according to embodiments of the disclosed subject matter. The lock 130, which may be elongate, may have a base 132 and a first projection 136 extending from a first side of the base 132. The base 132 may be referred to herein as a second portion of the lock 130 and the first projection 136 may be referred to as a first portion of the lock 130. Optionally, the lock 130 may have a second projection 138, which may extend from a second side of the base 132 opposite the first side, such as shown in FIG. 3B. The second projection 138 may also be considered part of the above-discussed second portion of the lock 130 in one or more embodiments.

The base 132 may have opposing ends, each of which may be flat and optionally parallel to each other. A bottom wall of the base 132, i.e., the first side of the base 132 from which the first projection 136 extends, can be curved or arcuate, for instance, to match or substantially match the curvature of the rim base 104. The base 132 may also have a pair of sidewalls, which may be referred to as an inner sidewall 133 and an outer sidewall 134. The inner sidewall 133 may be angled or inwardly sloping. Optionally, the outer sidewall 134 may be inwardly angled or sloping. Hence, the inner sidewall 133 and the outer sidewall 134 may be referred to as inner inwardly sloping sidewall 133 and outer inwardly sloping sidewall 134. As shown in FIG. 3B, a top wall 135 (and optionally the second projection 138) may connect the inner sidewall 133 and the outer sidewall 134. Optionally, the lock 130 may be symmetrical. Hence, the inner or outer characterizations of the sidewalls 133, 134 may change based on the orientation of the lock 130.

The first projection 136 may have a length less than a length of the base 132. The first projection 136 may also have a width less than a width of the base 132. On the other hand, the first projection 136 may extend in a thickness direction more than the base 132. That is, the first projection 136 may be viewed as being thicker than the base 132.

The second projection 138 may have a length less than the length of the base 132. The second projection 138 may also have a width less than the width of the base 132. On the other hand, the second projection 138 may extend in a thickness direction more than the base 132. That is, the second projection 138 may be viewed as being thicker than the base 132. Optionally, the length of the second projection 138 may be less than the length of the first projection 136. The heights of the first projection 136 and the second projection 138 in the thickness direction of the lock 130 may be the same or different. For instance, the height of the first projection 136 may be greater than the height of the second projection 138.

The configuration of the lock 130 may be to act as a key to ensure proper placement in the wheel rim assembly 100. For instance, the first projection 136 may be sized to be friction-fit into the slot 108 of the rim base 104 but may be too long to be received in the cut-out 122 of the bead seat band 120. Additionally or alternatively, the second projection 138 may be sized to be friction-fit in the cut-out 122 but not in the slot 108 of the rim base 104.

Figure 3C:
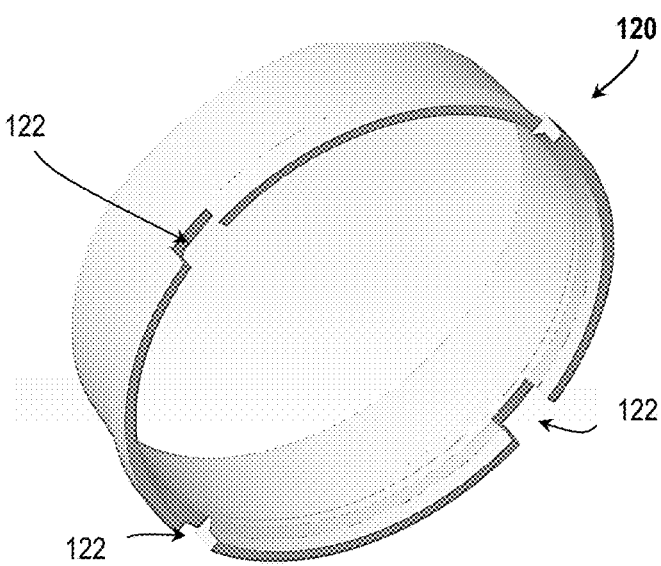
FIG. 3C shows an outer end view of a bead seat band of the wheel rim assembly of FIG. 1.

FIG. 3C is a perspective view of the exemplary bead seat band 120. As noted above, the bead seat band 120 may fit around the rim base 104, particularly the outer end portion 105 thereof. The bead seat band 120 can include one or more notches or cut-outs 122. FIG. 3C, for instance, shows four cut-outs 122. According to one or more embodiments, the cut-outs 122 may be spaced equally around the circumference of the bead seat band 120 such that the cut-outs 122 are spaced from each other by an equal distance. FIG. 3C, for instance, shows the cut-outs 122 spaced from adjacent cut-outs 122 by ninety degrees. The cut-outs 122 may extend entirely through the bead seat band 120. Generally, the cut-outs 122 may be sized to receive a portion of the lock 130, such as the second projection 138 of the lock 130. Optionally, the cut-outs 122 may be a cut-out into an outer edge of the bead seat band 120, such as shown in FIG. 3C, rather than inward of the outer edge of the bead seat band 120.

Returning to FIG. 1 and FIG. 2, each lock 130 may be provided in or received by a corresponding one of the slots 108 in the outer end portion 105 of the rim base 104. As shown, the first projection 136 of the lock 130 may extend into the slot 108. Optionally, the first projection 136 may not extend past the bottom of the slot 108. When the first projection 136 of the lock 130 is in the slot 108 the base 132 of the lock 130 may not extend into the slot 108. That is, according to one or more embodiments, no part of the base 132 of the lock 130 may extend into the slot 108. The bottom surface of the base 132 may be flush with the outer radial surface of the rim base 104. The lock 130 may be engaged with the rim base 104 in the slot 108 without use of an adhesive.

Figure 4:
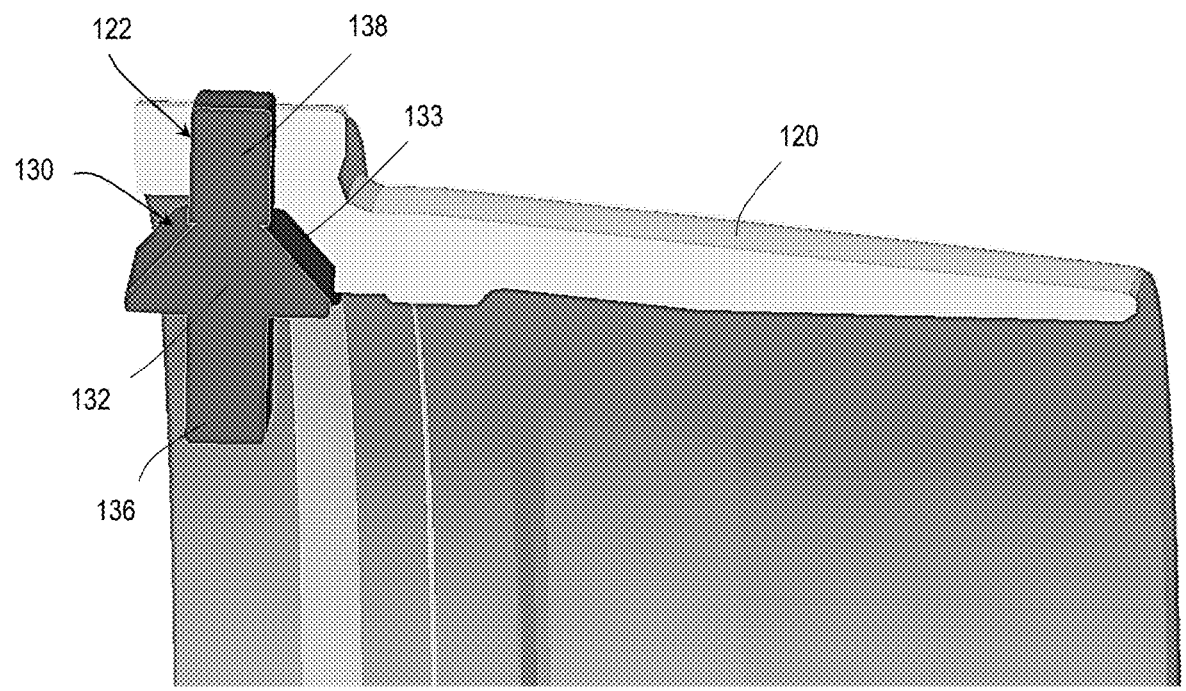
FIG. 4 is sectional view of an interface between a lock and a bead seat band according to one or more embodiments of the disclosed subject matter.
Figure 5:
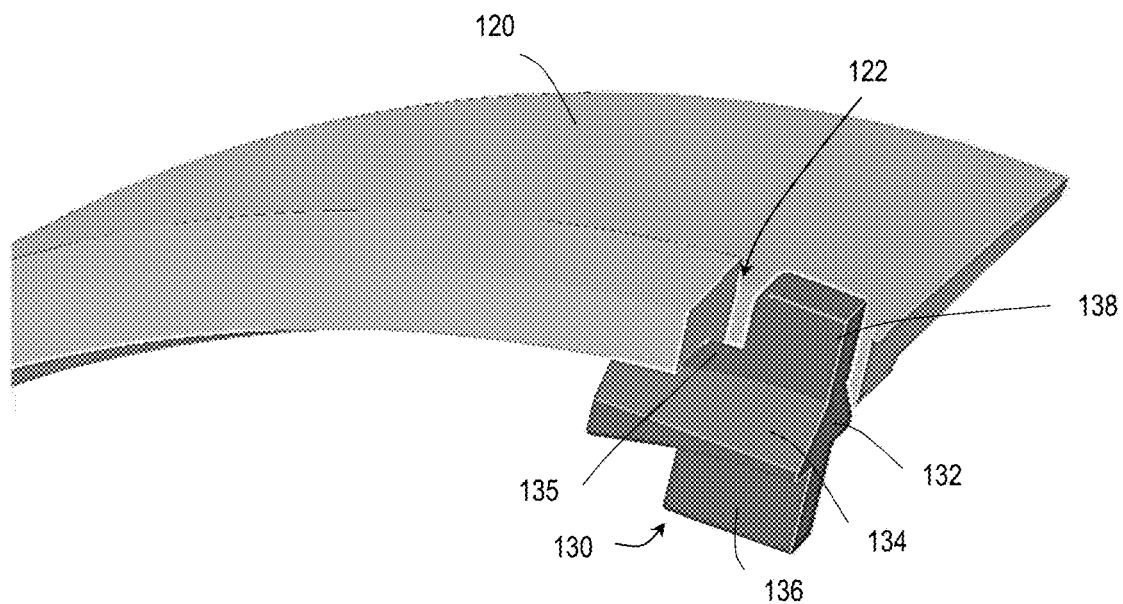
FIG. 5 is another sectional view of the interface between the lock and the bead seat band of FIG. 4.

As shown in FIG. 4 and FIG. 5, as well as FIG. 2, each lock 130 may be provided in or received by a corresponding one of the cut-outs 122 of the bead seat band 120. In particular, according to one or more embodiments, the second projection 138 of the lock 130 may be provided in or received by the cut-out 122 of the bead seat band 120. The second projection 138 may extend at least all the way through the cut-out 122 in a thickness direction of the cut-out 122. Optionally, the second projection 138 may project from an outer radial surface of the bead seat band 120, such as shown in FIG. 4.

According to one or more embodiments, when the lock 130 is positioned in the cut-out 122 of the bead seat band 120 the base 132 of the lock 130 may be adjacent to the bead seat band 120, such as shown in FIG. 2. For instance, at least a portion of the inner sidewall 133 of the lock 130 may directly interface or contact the bead seat band 120, such as shown in FIG. 4. As shown in FIG. 5, the top wall 135 of the lock 130 may also be in direct contact with the bead seat band 120, particularly a radially inner surface of the bead seat band 120. Optionally, a gap may exist on one or both ends of the second projection 138 relative to inner surfaces of the bead seat band 120 that define the cut-out 122. Such gap(s) may accommodate placement of the second projection 138 in the cut-out 122. The lock 130 may be engaged with the bead seat band 120 in the cut-out 122 without use of an adhesive.

Figure 6:
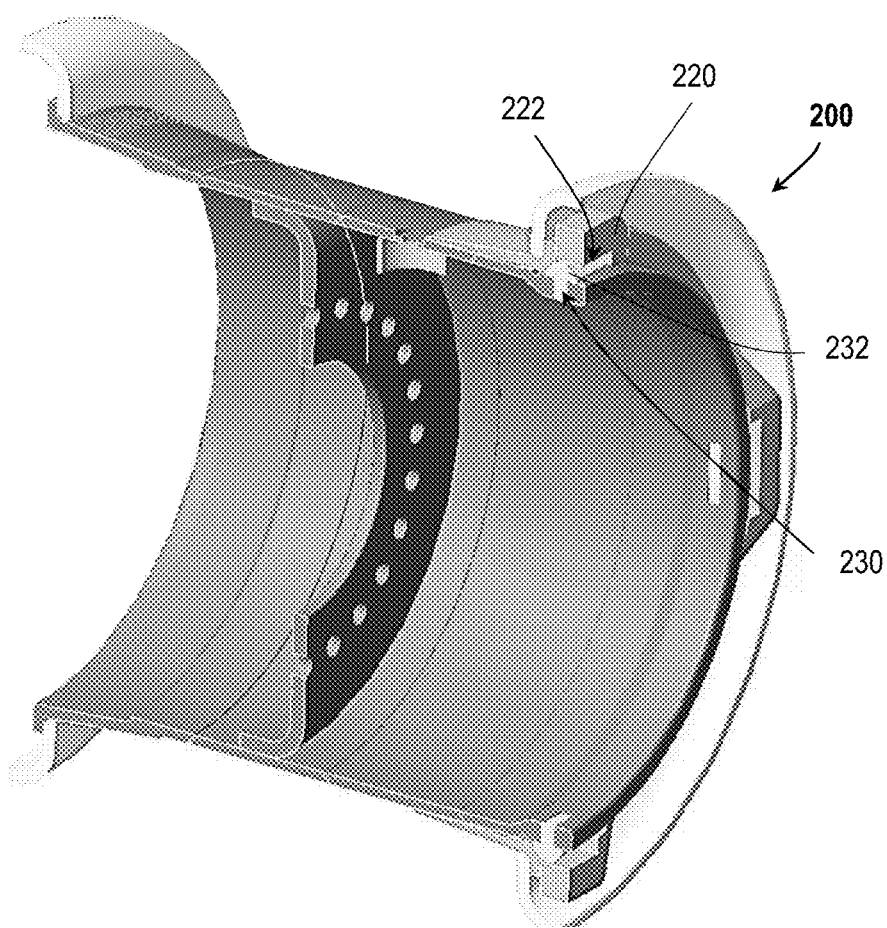
FIG. 6 is a sectional view of a wheel rim assembly according to another embodiment of the disclosed subject matter.
Figure 7:
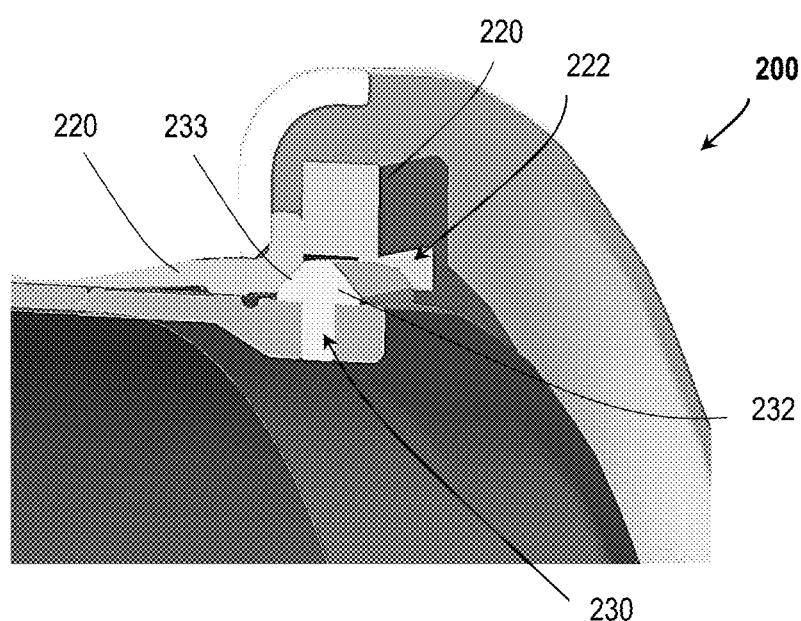
FIG. 7 is an enlarged sectional view of an outer end portion of the wheel rim assembly of FIG. 6.

Turning to FIG. 6 and FIG. 7, these figures show a wheel rim assembly 200 according to another embodiment of the disclosed subject matter. Notably, the locks 230 can be without a second projection, and a base 232 of each of the locks 230 can be provided in respective cut-outs 222 of a bead seat band 220. The cut-outs 222 of the bead seat band 220 may also have outer radially walls defined by the bead seat band 220, rather than being open as in the previous embodiment. That is, the cut-outs 222 may be defined on all sides by the bead seat band 220. Optionally, the bead seat band 220 may also interface or be in direct contact with more of inner sidewall 233 of base 232 of lock 230 as compared to the previous embodiment. Such interface between the bead seat band 220 and the inner sidewall 233 may create a seal therebetween. The bead seat band 220 may be comprised of two components fixed (e.g., welded) together, that is, one component of the combination that abuts the inner sidewall 233 and another component of the combination that forms the top and end walls of the cut-outs 222 that are integral or formed in one piece as the bead seat band 220 as an end component.

Figure 8:
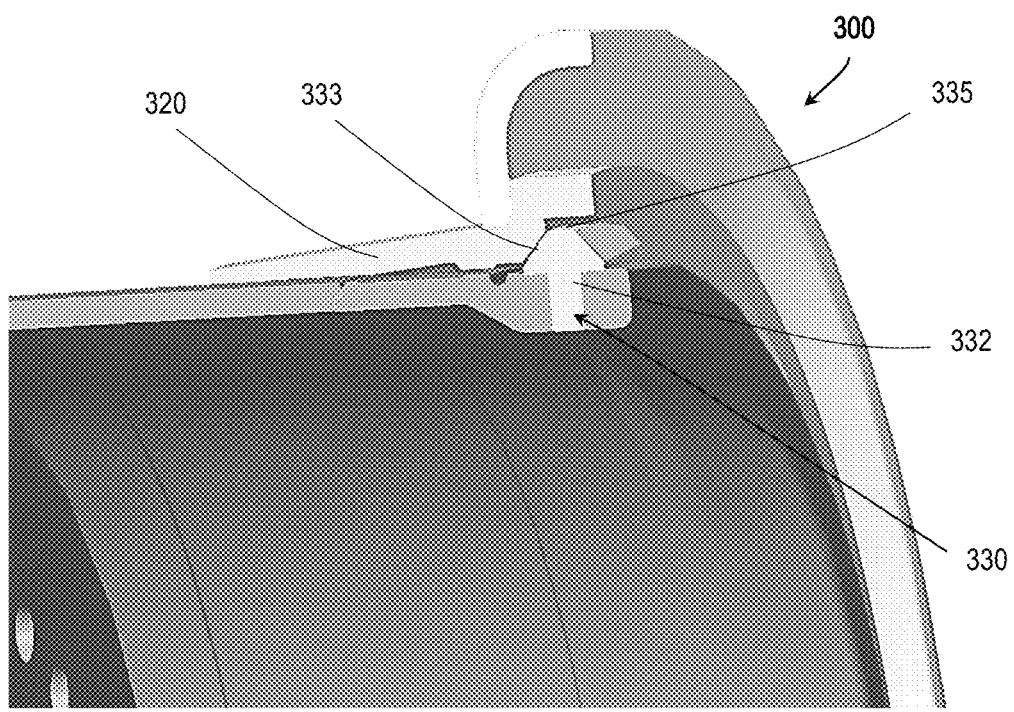
FIG. 8 is a sectional view of an outer end portion of a wheel rim assembly according to yet another embodiment of the disclosed subject matter.

FIG. 8 is a sectional view of an outer end portion of a wheel rim assembly 300 according to yet another embodiment of the disclosed subject matter. In the wheel rim assembly 300 a lock 330 may be the same or the lock 230 discussed in the previous embodiment, but the interface with bead seat band 320 may be different. In particular, the bead seat band 320 may not include any cut-outs, and the bead seat band 320 may interface or be in direct contact with inner sidewall 333 of base 332 of lock 330. Such interface between the bead seat band 320 and the inner sidewall 333 may create a seal therebetween. Top wall 335 of the base 332 may be provided adjacent to an inner radial wall of the bead seat band 320.

Figure 9:
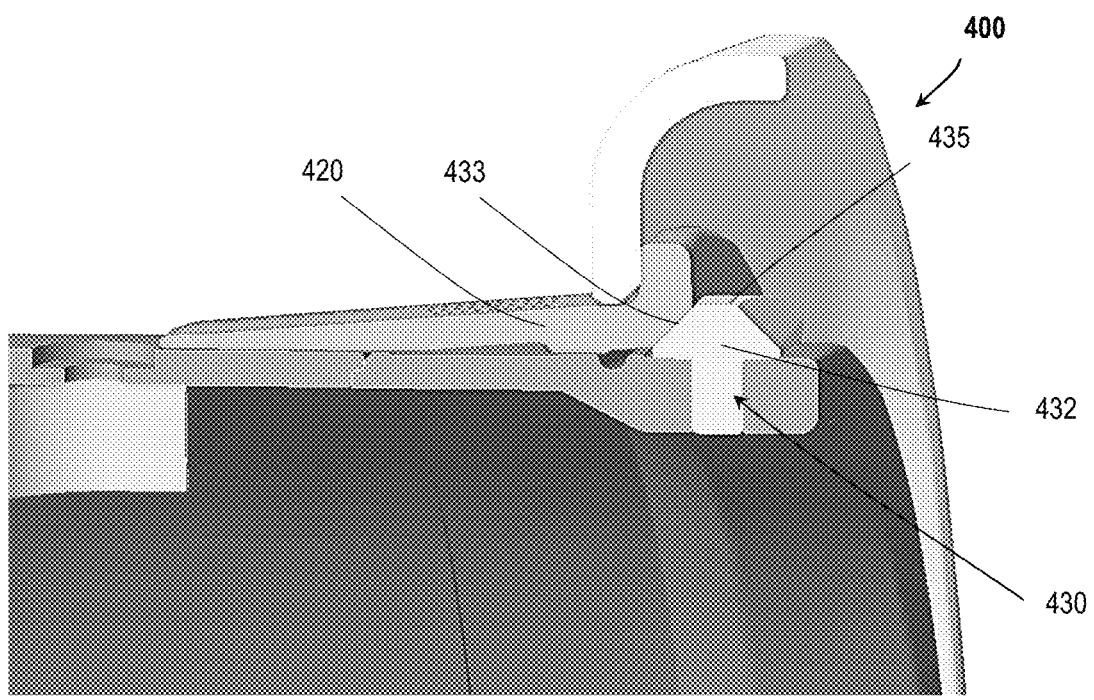
FIG. 9 is a sectional view of an outer end portion of a wheel rim assembly according to an embodiment of the disclosed subject matter.

FIG. 9 is a sectional view of an outer end portion of a wheel rim assembly 400 according to an embodiment of the disclosed subject matter. The wheel rim assembly 400 is similar to the wheel rim assembly 200 of FIG. 6 and FIG. 7 but without cut-outs 222. Hence, bead seat band 420 may interface or be in direct contact with inner sidewall 433 of base 432 of lock 430. In this embodiment, the bead seat band 420 may not extend over the top wall 435 of the base 432.

INDUSTRIAL APPLICABILITY

As noted above, the present disclosure relates to locks for wheel rims and assemblies, systems, and methods thereof.

Wheel rims are used to install tires to vehicles, such as manufacturing or construction vehicles (e.g., wheel loaders). Wheel rims used on vehicles with relatively large tires may have structurally reinforced beads that are not sufficiently deformable to slide over side flanges of the rims. As a result, the rims can be formed of multiple pieces, for example, three pieces, four pieces, or five pieces, to facilitate mounting the tires on the rims and removing the tires from the rims. Though FIGS. 1-9 show and describe wheel rim assemblies in the context of five-piece wheel rim assemblies, embodiments of the disclosed subject matter are not so limited.

Rather, embodiments of the disclosed subject matter may also implement or involve other multi-piece wheel rim assemblies, such as three- and four-piece wheel rim assemblies. In the case of three- and four-piece wheel rim assemblies an outer flange or side ring may also serve as a bead seat band, such as bead seat bands 120, 220, 320, and 420. That is, the outer flange or side ring and the bead seat band may be integral or formed in one piece. As a non-limiting example, wheels having diameters of twenty-nine inches or greater may be five-piece wheel rim assemblies.

Embodiments of the disclosed subject matter can provide a wheel rim assembly that can implement a lock, such as locks 130, 230, 330, 430 described above, in lieu of a lock ring, to provide the functionality of the lock ring. Hence, wheel rim assemblies according to embodiments of the disclosed subject matter (e.g., wheel rim assemblies 100, 200, 300, 400), may be free of or without the lock or locking ring between the outer end portion of the rim base and the bead seat band and first side ring.

Implementation of one or more locks (e.g., locks 130, 230, 330, 430) according to embodiments of the disclosed subject matter, therefore, can prevent movement of other components in the direction along the central longitudinal axis of rotation of the rim. Accordingly, one or more locks according to embodiments of the disclosed subject matter may, as a primary function, for instance, preventing or minimize movement of at least the rim base and the bead seat band in the direction of the central longitudinal axis of the wheel rim. The one or more locks may also prevent or minimize such movement of the first side ring and/or the tire bead adjacent the first side ring. Such prevention or minimization may be helpful to maintain sealing contact between the rim base and the bead seat band and/or sealing contact between the bead seat band and the first flange (in a case that the two are separate components). As noted above, sealing contact may also be made between the inner sidewall of the lock(s) and the bead seat band. Moreover, such primary function may be with the assistance of the pressure of the tire when the tire is inflated to an operation range (e.g., a tire pressure for driving), and may help retain air (or other fluid) in the inflated tire.

Also, when vehicles having multi-piece wheel rims rapidly accelerate or decelerate, one or more of the tires may resist spinning with respect to the ground while the wheel rims are responding to drive trains of the vehicles attempting to rotate the tires. This can result in relative movement between the rims and the tires. More particularly, frictional engagement between side flanges of the wheel rims and the tires can cause the side flanges to move in unison with the tires while the rim bases move in response to the drive trains, either faster or slower than the tires. As a result, the rim bases may move relative to the side flanges, which, in turn, may cause parts of the rims to separate and/or allow air to leak between parts of the rims.

Implementation of one or more locks (e.g., locks 130, 230, 330, 430) according to embodiments of the disclosed subject matter can prevent or minimize indexing or rotation of rim components. That is, implementation of one or more locks according to embodiments of the disclosed subject matter can provide, as a secondary function, for instance, preventing or minimizing rotation or indexing of at least the rim base and the bead seat band relative to each other. The one or more locks can also prevent rotational movement or indexing of the first and/or second side rings relative to the rim base and/or bead seat band.

Embodiments of the disclosed subject matter may also involve a method. The method can involve or include providing a wheel rim assembly according to embodiments of the disclosed subject matter, such as wheel rim assemblies 100, 200, 300, 400. Such method may include or be characterized as assembly of the wheel rim assembly or a corresponding tire assembly comprised of the wheel rim assembly.

The providing may thus include providing the wheel rim assembly a rim base, providing a bead seat band, and providing one or more locks, such one of those shown and described herein with respect to wheel rim assemblies 100, 200, 300, 400. One or more flanges or side rings, such as those described herein, can be provided with respect to wheel rim assemblies 100, 200, 300, 400. As noted above, according to one or more embodiments the bead seat band and outer flange or side ring may be unitary or formed in one piece (e.g., for three- or four-piece wheel rim assemblies).

The providing may constitute providing the individual components for the wheel rim assembly (e.g., wheel rim assemblies 100, 200, 300, 400) in unassembled form. Alternatively, the providing may constitute providing the individual components for the wheel rim assembly in assembled form. In either case, the wheel rim assembly can be without or free of a lock or locking ring. This lacking may be characterized as the wheel rim assembly not having a compressed part (i.e., the lock ring). Notably, one or more locks according to embodiments of the disclosed subject matter (e.g., locks 130, 230, 330, 430) can interface with each of a rim base and a bead seat band according to embodiments of the disclosed subject matter. Moreover, such interfaces can be without use of an adhesive. Accordingly, locks according to embodiments of the disclosed subject matter may be adapted to be provided across different types of wheel assemblies (e.g., three-piece, four-piece, and five-piece assemblies) and/or across different sizes of wheel assemblies (e.g., twenty-nine inch diameter or greater or below twenty-nine inch diameter).

Going from the unassembled form to the assembled form may be characterized as mounting the wheel rim assembly or tire assembly (including wheel rim assembly) to an axle of a vehicle. Such mounting may be characterized as vertical or horizontal mounting. Thus, the method can include assembling the wheel rim assembly or tire assembly (including wheel rim assembly), according to a configuration of embodiments of the disclosed subject matter, such wheel rim assemblies 100, 200, 300, 400. As noted above, the assembly can be performed without use of a lock or locking ring, which may make assembly relatively more easy and/or more secure, particularly because it is not necessary to take into account the compressive force (including the need to first stretch or expand the lock ring to go over the rim base) in the case of assembling with the lock ring. That is, assembling using the one or more locks according to embodiments of the disclosed subject matter may merely involving providing the lock(s), without compressive force and the need to stretch or expand the lock(s), in the slot(s) of the outer end portion of the rim base and the cut-out(s) of the bead seat band.

One or more assembly tools may be used to assemble the wheel rim assembly. For instance, when the wheel rim assembly may be subject to gravitational forces that would cause one or more of the wheel rim assembly components to fall apart (e.g., down), such as during a vertical mounting or assembly process, one or more assembly tools may be used to retain the wheel rim assembly in place. For example, the one or more assembly tools may be removably coupled to the outer surface of the outer end portion of the rim base and extend radially outward and around the top surface of the lock, for instance, the top surface of the second projection, to ensure the lock stays in place. The one or more assembly tools can be removed after assembly of the wheel rim assembly or tire assembly (including wheel rim assembly). Optionally, flange locks may be removably provided to prevent flange rotation during the assembly. Once the components of the wheel rim assembly are properly provided, the tire can be inflated, for instance, to an operating or driving inflation pressure for the particular tire, vehicle, and/or road surface.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

The invention claimed is:

1. A multi-component wheel rim for a tire of a construction or manufacturing vehicle, the multi-component wheel rim comprising:
  a rim base having an inner end portion, an outer end portion opposite the inner end portion, and a middle portion extending between the inner end portion and the outer end portion in a direction of a central longitudinal axis of the multi-component wheel rim, a plurality of slots extending entirely through the outer end portion of the rim base, the slots being spaced apart from each other around a circumference of the rim base;
  a pair of side rings, a first side ring of the pair of side rings circumscribing the outer end portion of the rim base and a second side ring of the pair of side rings circumscribing the inner end portion of the rim base;
  a bead seat band circumscribing the outer end portion of the rim base and being circumscribed by the first side ring such that a portion of the bead seat band is between and in direct contact with the first side ring and the outer end portion of the rim base; and
  a plurality of locks respectively provided in the plurality of slots of the outer end portion of the rim base, each of the locks being elongate with a base and a first projection, the first projection extending from a first side of the base and into the slot of the rim base, and the base being outside of the slot of the rim base,
  wherein each of the locks has a pair of opposing inward sloping sidewalls, including an inner inward sloping sidewall and an outer inward sloping sidewall, the inner inward sloping sidewall directly interfacing with the bead seat band.

2. The multi-component wheel rim according to claim 1, wherein the plurality of locks consist of two locks, three locks, or four locks equally spaced from each other around the circumference of the rim base.

3. The multi-component wheel rim according to claim 1, wherein each of the locks is adapted to perform as a primary function preventing movement of the rim base, the bead seat band, and the first side ring in the direction of the central longitudinal axis of the multi-component wheel rim and as a secondary function preventing rotational movement of the rim base, the bead seat band, and the first side ring relative to each other.

4. The multi-component wheel rim according to claim 1, wherein each of the locks includes a second projection extending from a second side of the base opposite the first side, and
  wherein the second projections extend into respective ones of a plurality of cut-outs of the bead seat band.

5. The multi-component wheel rim according to claim 1, wherein the bead seat band includes a plurality of cut-outs, and
  wherein portions of the locks are respectively provided in the cut-outs.

6. A method regarding a multi-component wheel rim comprising:
  providing a rim base of the multi-component wheel rim, the rim base having an inner end portion, an outer end portion opposite the inner end portion, and a middle portion extending between the inner end portion and the outer end portion, a plurality of slots extending through the outer end portion of the rim base, the slots being spaced apart from each other around a circumference of the rim base;
  providing a bead seat band of the multi-component wheel rim, the bead seat band being adapted to, when assembled, circumscribe the outer end portion of the rim base such that a portion of the bead seat band is in direct contact with the outer end portion of the rim base; and
  providing a plurality of locks respectively provided in the plurality of slots of the outer end portion of the rim base, each of the locks having a base and a first projection, the first projection extending from a first side of the base and being adapted to extend into the slot of the rim base when assembled,
  wherein the multi-component wheel rim is without a lock ring when assembled.

7. The method according to claim 6, wherein said providing the rim base, said providing the bead seat band, and said providing the plurality of locks are performed prior to inflation of a tire assembly provided circumferentially around the multi-component wheel rim to a driving pressure.

8. The method according to claim 6, further comprising assembling the provided rim base, the provided bead seat band, and the provided plurality of locks such that the bead seat band circumscribes the outer end portion of the rim base such that the portion of the bead seat band is in direct contact with the outer end portion of the rim base and such that the first projection of each of the plurality of locks extends into the slot of the rim base.

9. The method according to claim 6, wherein said providing the rim base, said providing the bead seat band, and said providing the locks are performed as part of a vertical mounting process of mounting the multi-component wheel rim.

10. A wheel rim assembly comprising:
  a rim base having at least one slot at an outer end portion thereof;
  a bead seat band radially outward of and in direct contact with the outer end portion of the rim base; and
  at least one lock respectively provided in the at least one slot,
  wherein each said at least one lock has a first portion that is provided in the at least slot of the rim base and a second portion that is outside of the slot and adjacent to the bead seat band, and
  wherein the wheel rim assembly is free of a lock ring at the outer end portion of the rim base between the rim base and the bead seat band.

11. The wheel rim assembly according to claim 10, wherein said at least one slot includes a plurality of slots spaced apart from each other around a circumference of the rim base, and wherein said at least one lock includes a plurality of locks in one-to-one correspondence with respective ones of the plurality of slots.

12. The wheel rim assembly according to claim 11, wherein the bead seat band includes a plurality of cut-outs in one-to-one correspondence with respective ones of the plurality of locks.

13. The wheel rim assembly according to claim 10, wherein each said at least one lock is adapted to perform a primary function of preventing movement of at least the rim base and the bead seat band in a direction of a central longitudinal axis of the wheel rim.

14. The wheel rim assembly according to claim 10, wherein each said at least one lock is adapted to perform a secondary function of preventing indexing of at least the rim base and the bead seat band relative to each other.

15. The wheel rim assembly according to claim 10, wherein each said at least one lock includes a base as said second portion and a first projection as said first portion, the first projection extending from a first side of the base and into the at least one slot of the rim base, and the base being adjacent to the bead seat band.

16. The wheel rim assembly according to claim 15,
wherein each said at least one lock includes a second projection extending from a second side of the base opposite the first side,
wherein the bead seat band includes at least one cut-out, and
wherein each said second projection extends into a respective one of the at least one cut-out of the bead seat band.

17. The wheel rim assembly according to claim 15, wherein the base of each said at least one lock has a pair of opposing inward sloping sidewalls, including an inner inward sloping sidewall and an outer inward sloping sidewall, the inner inward sloping sidewall directly interfacing with the bead seat band.

18. The wheel rim assembly according to claim 10, wherein each said at least one lock is engaged with the rim base and the bead seat band without use of an adhesive.

* * * * *